H. L. WINSLOW.
PAIL.
APPLICATION FILED DEC. 16, 1911.

1,080,668.

Patented Dec. 9, 1913.

Witnesses

Inventor
Henry L. Winslow
By Victor J. Evans
Attorney

UNITED STATES PATENT OFFICE.

HENRY L. WINSLOW, OF FALL RIVER, MASSACHUSETTS.

PAIL.

1,080,668.  Specification of Letters Patent.  Patented Dec. 9, 1913.

Application filed December 16, 1911. Serial No. 666,149.

*To all whom it may concern:*

Be it known that I, HENRY L. WINSLOW, a citizen of the United States, residing at Fall River, in the county of Bristol and State of Massachusetts, have invented new and useful Improvements in Pails, of which the following is a specification.

The invention relates to pails, more particularly to dinner pails and has for an object to provide a dinner pail for containing various articles of food and in which an even temperature of the food can be approximately maintained. For the purpose mentioned, use is made of a series of receptacles, one adapted to fit within the other with the bottom of one receptacle constituting the cover of an adjacent receptacle, the outer receptacle being provided with walls having the space between the same filled with a material that is non-conductive of temperature and a cover for removable engagement with the outer receptacle and adapted to close the uppermost receptacle, a suitable bail being provided for transporting my device from one place to another.

Reference is to be had to the accompanying drawings constituting a part of this specification, in which similar characters of reference denote corresponding parts in all the views, and in which—

Figure 2:
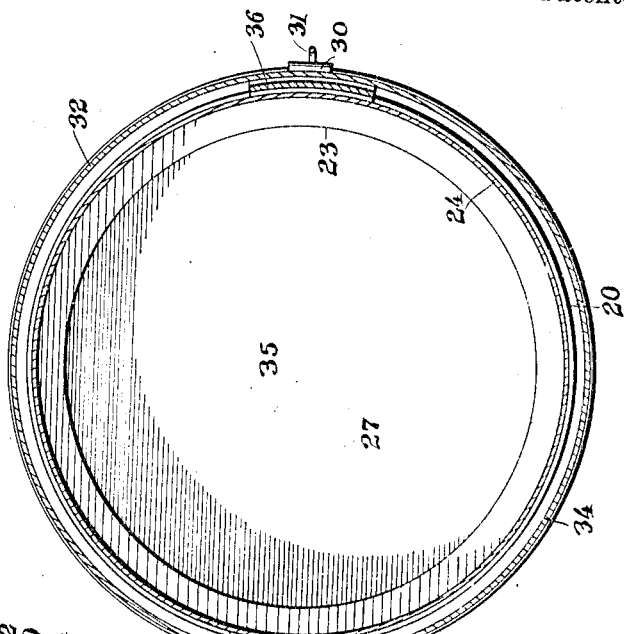
Figure 1:
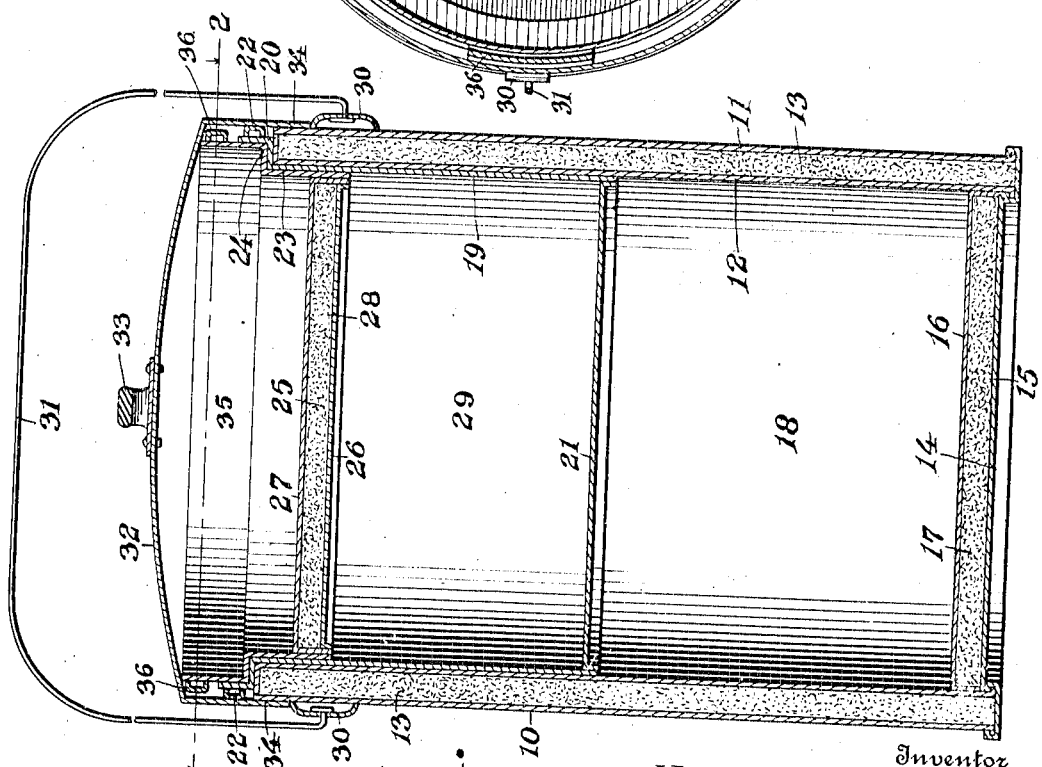

Figure 1 is a vertical sectional view of my device. Fig. 2 is a horizontal sectional view taken on the line 2—2 in Fig. 1, looking in the direction of the arrow.

Referring more particularly to the views, I provide a receptacle 10 having walls 11 and 12, the said walls being spaced apart with a non-conductive material 13, such as asbestos or the like, interposed between the walls 11 and 12. A bottom 14 is provided for the receptacle 10 and consists of walls 15, 16, the said walls being spaced apart to receive therebetween a non-conducting material 17, similar to the non-conducting material 13, the said bottom 14 being soldered or otherwise conveniently secured to the lower end of the inner wall 12 to provide a chamber 18.

A receptacle 19 is provided with an upper flanged end 20 and a bottom 21 and the said receptacle 19 is adapted to fit within the receptacle 10 with the flanged portion 20 resting upon the upper end of the receptacle 10 so that the bottom 21 of the receptacle 19 will form a cover for the chamber 18, suitable handles 22 are secured to the upper flanged end 20 of the receptacle 19, the said handles being arranged to lie within the plane of the outer wall 11 of the receptacle 10 for a purpose that will be hereinafter more fully disclosed. A third receptacle 23, provided with a flanged portion 24 and a bottom 25, consisting of spaced walls 26 and 27 having a non-conductive material 28, similar to the non-conductive materials 13 and 17, interposed between the walls 26 and 27, is adapted to be received within the receptacle 19 so that the bottom 25 of the receptacle 23 will form a cover for the chamber 29, formed by the walls and bottom 21 of the receptacle 19, as shown in Fig. 1, the flanged portion 24 of the receptacle 23 being adapted to repose upon the flanged portion 20 of the receptacle 19 with the upper extremity of the receptacle 23 extending upwardly beyond the upper end of the receptacle 19.

Secured to the outer wall 11 of the receptacle 10 are knobs 30, having pivotally connected thereto the ends of a bail 31 and mounted to inclose the upper end of the receptacle 10 is a cover 32, provided with a handle 33 and a depending peripheral flange 34, the lower end of which is adapted to abut against the knobs 30, thus limiting the downward movement of the cover, the mentioned knobs so being adapted to act as stop members for the cover as will be readily understood. By referring to Fig. 1, it will be seen that the cover 32 not only acts as a cover for a chamber 35, formed by the walls and bottom of the receptacle 23, but also incloses the upper end of the receptacle 10, the upper extremity of the receptacle 10 being adapted to engage the under side of the cover, thus sealing the chamber 35.

The chamber 18 is adapted to receive a warm liquid and by providing the non-conductive material between the walls of the receptacle 10 and between the walls of the bottom thereof, the heat contained in the liquid will be prevented from radiating outwardly through the walls of the receptacle. In a similar manner the heat contained in any food within the chamber 29 will also be prevented from radiating outwardly through the walls of the receptacle 19 inasmuch as the walls of the receptacle 10 act as a backing for the walls of the receptacle 19, the walls of the receptacle 10 being spaced apart and having interposed therebetween suitable non-conductive material 13